(12) United States Patent
Knoener et al.

(10) Patent No.: US 11,554,450 B2
(45) Date of Patent: Jan. 17, 2023

(54) MULTIPLE SPEED FAN

(71) Applicant: Illinois Tool Works Inc., Glenview, IL (US)

(72) Inventors: Craig Knoener, Appleton, WI (US); Ron Dewayne Woodward, Kaukauna, WI (US); Mary Divya Poulose, San Francisco, CA (US)

(73) Assignee: Illinois Tool Works Inc., Glenview, IL (US)

( * ) Notice: Subject to any disclaimer, the term of this patent is extended or adjusted under 35 U.S.C. 154(b) by 313 days.

(21) Appl. No.: 15/604,906

(22) Filed: May 25, 2017

(65) Prior Publication Data

US 2018/0339376 A1    Nov. 29, 2018

(51) Int. Cl.

| B23K 37/00 | (2006.01) |
|---|---|
| B23K 9/32 | (2006.01) |
| B23K 9/10 | (2006.01) |
| F04D 27/00 | (2006.01) |
| F24F 11/77 | (2018.01) |
| F24F 11/52 | (2018.01) |
| F24F 11/64 | (2018.01) |

(52) U.S. Cl.
CPC .............. *B23K 37/003* (2013.01); *B23K 9/10* (2013.01); *B23K 9/1056* (2013.01); *B23K 9/32* (2013.01); *F04D 27/004* (2013.01); *F24F 11/52* (2018.01); *F24F 11/64* (2018.01); *F24F 11/77* (2018.01)

(58) Field of Classification Search
CPC .......... B23K 9/10; B23K 9/32; B23K 37/003; B23K 9/1056; F24F 11/52; F24F 11/64; F24F 11/77; F04D 27/004

USPC ....................................................... 219/130.1
See application file for complete search history.

(56) References Cited

U.S. PATENT DOCUMENTS

| 5,059,766 | A | 10/1991 | Gilliland |  |
|---|---|---|---|---|
| 5,624,589 | A | 4/1997 | Latvis et al. |  |
| 5,825,642 | A | 10/1998 | Ishii et al. |  |
| 6,659,723 | B2 | 12/2003 | Bankstahl |  |
| 6,888,099 | B1 | 5/2005 | Schneider |  |
| 8,462,505 | B2 | 6/2013 | Nagami et al. |  |
| 2006/0043082 | A1* | 3/2006 | Martin | B23K 9/32 219/130.5 |
| 2008/0061047 | A1* | 3/2008 | Borowy | B23K 9/32 219/130.1 |
| 2010/0308782 | A1* | 12/2010 | Werle | H02M 3/157 323/282 |
| 2010/0309697 | A1* | 12/2010 | Werle | H02M 1/4208 363/126 |
| 2013/0112367 | A1* | 5/2013 | Kooken | B23K 9/1006 165/11.1 |
| 2013/0291951 | A1* | 11/2013 | Carman | B08B 15/04 137/10 |
| 2013/0327746 | A1* | 12/2013 | Hemmert | B23K 9/125 219/124.1 |

(Continued)

*Primary Examiner* — Dana Ross
*Assistant Examiner* — Kuangyue Chen
(74) *Attorney, Agent, or Firm* — McAndrews Held & Malloy, Ltd.

(57) ABSTRACT

A welding-type power supply includes a fan configured to operate at multiple fan speeds. A controller of the welding-type power supply is configured to identify a welding parameter of the welding-type power supply, and determine an operating fan speed of the multiple fan speeds based on the welding parameter.

19 Claims, 2 Drawing Sheets

(56) References Cited

U.S. PATENT DOCUMENTS

| | | | |
|---|---|---|---|
| 2014/0366721 A1* | 12/2014 | Roy | B01D 46/444 |
| | | | 95/22 |
| 2015/0014290 A1* | 1/2015 | Kooken | B23K 9/09 |
| | | | 219/130.1 |
| 2016/0125593 A1* | 5/2016 | Becker | G06T 7/73 |
| 2018/0117718 A1* | 5/2018 | Rajagopalan | B23K 37/0531 |
| 2018/0339376 A1* | 11/2018 | Knoener | B23K 9/32 |

\* cited by examiner

MULTIPLE SPEED FAN

BACKGROUND

Welding is a process that has become ubiquitous in various industries and applications, such as construction, ship building, and so forth. Welding power supplies are constructed with a housing to protect internal electrical components. Welding systems operate at high power levels which results in internal components reaching elevated temperatures. In order to cool the internal components, fans have been incorporated into the welding power supply to introduce air flow over the electrical components. A forceful air flow can create an additional problem by introducing heavy particulates from the work environment into the interior of the housing. These particulates can build up on various components and can damage and/or shorten the life of certain electrical components of the power supply. Thus, a system to reduce power consumption, provide targeted cooling of internal electronics, and mitigate exposure to environmental hazards is desirable.

SUMMARY

Methods and systems are provided for a welding-type power supply employing a multiple speed fan, substantially as illustrated by and described in connection with at least one of the figures, as set forth more completely in the claims. In particular, the operation of the multiple speed fan is determined based on a welding parameter of the welding-type power supply.

DETAILED DESCRIPTION

Figure 1:
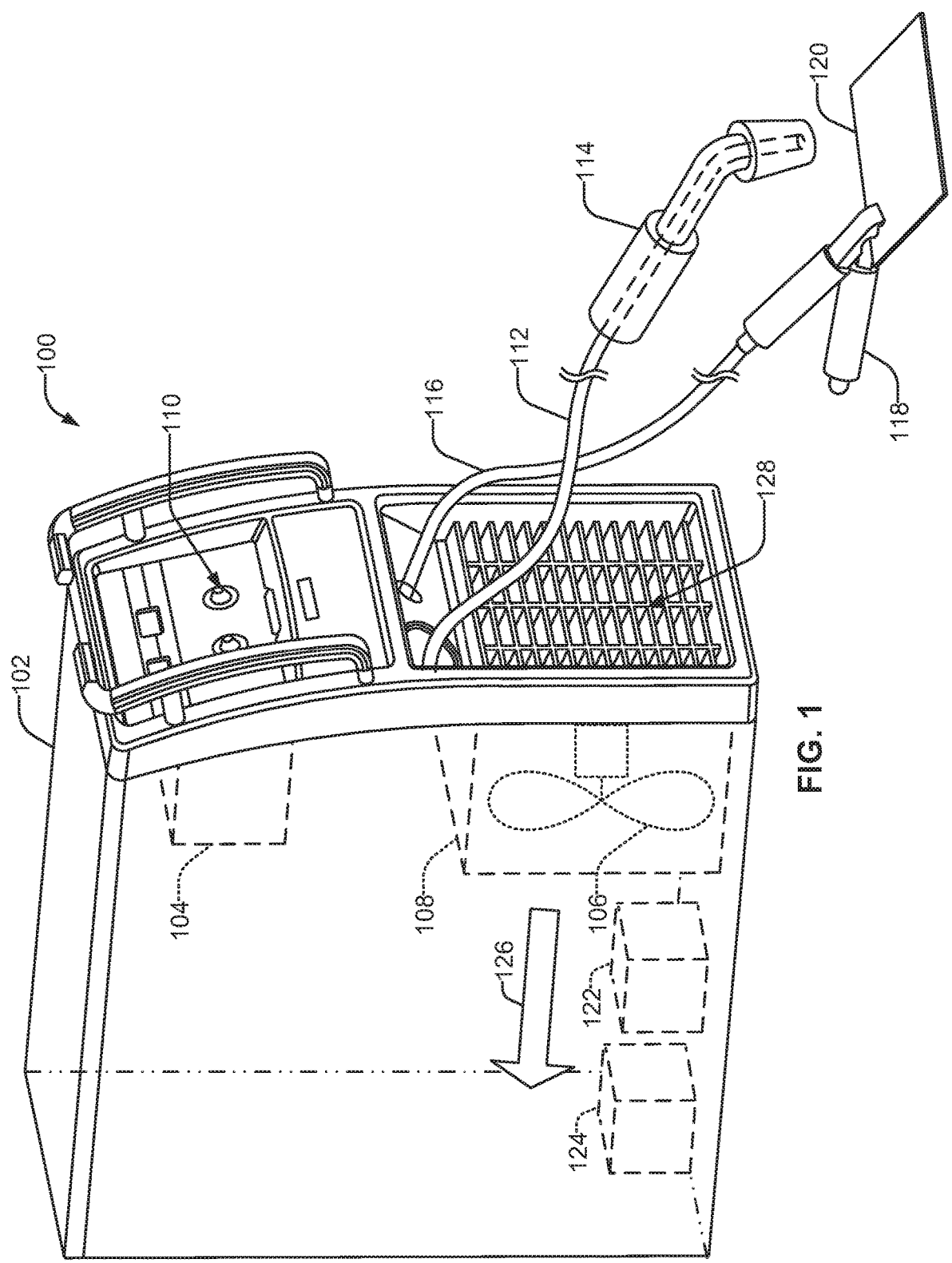
FIG. 1 is an example system that includes a welding-type power supply employing a multiple speed fan, in accordance with aspects of this disclosure.

Methods and systems are provided for determining a fan speed of a multiple speed fan in a welding-type power supply based on a welding parameter. Disclosed examples of the welding system are configurable such that a controller (e.g., software, hardware, or a combination of software and hardware) controls a speed of the multiple speed fan in response to one or more welding parameters. The use of a multiple speed fan and control results in economical use of power, less variation in component temperature, and a reduction in noise of the overall system.

Some welding-type systems employ an integrated fan (e.g., a 24V muffin fan) for cooling internal components. However, such fans were configured to run continuously, which increases the amount of energy needed and generates unnecessary noise.

In disclosed examples, a fan is provided that is capable of operating over a range of multiple speeds, controlled in response to operating characteristics of a welding-type power supply. Thus, the operation of the fan (e.g., a speed of the fan) is determined based on at least a welding parameter related to operation or type of process of the welding-type system.

Example weld parameters include process type (e.g., MIG, TIG, plasma, induction heating, etc.), electrode type, electrode diameter, wire feed speed, cable inductance, workpiece material thickness, power output, whether the welding-type tool is air cooled or water cooled, whether the wire is preheated and at what level, and other relevant parameters. Thus, the fan is operated at different speeds based on the weld parameters set. In an example, the fan speed is controlled by a switched mode power supply to vary the pulse width modulation (PWM) to the fan (e.g., an switched mode power supply or inverter-type fan). The switched mode power supply, as used herein is a module that controls the pulse width of a power circuit, so as to provide a desired output.

For known weld parameters (e.g., a particular process type), a set of operating values can be determined, such as system output and input, voltage and current levels, etc. When the welding-type system operates within one or more parameters, the fan speed can be selected and/or adjusted in response to one or more of the operating values to provide an appropriate level of cooling.

By contrast, conventional fans run at a single, maximum speed, activated in response to the welding-type power switch being turned on, and continue to run until the power switch is turned off. Fans can be activated in response to one or more temperature sensors, such that when an upper temperature threshold is reached the fan turns on, and the fan turns off when a lower temperature threshold is met. In each case, the fan operates at full speed when activated.

As disclosed herein, the multiple speed fan is controlled based on weld parameters. In operation, the fan is set to speeds selected to provide adequate cooling, instead of running at full speed regardless of operating conditions as in conventional systems. Running at multiple speeds thus reduces fan noise and power consumption and increases system efficiency. Further, the system is kept clean and in good operating condition, as fewer contaminants are drawn into the system at low speeds (i.e. as opposed to running at full speed even as operating conditions change), which decreases maintenance requirements and improves system reliability.

In the present disclosure, activation of the fan and the particular fan speed is dynamically controlled in response to welding parameters. In some examples, the fan is configured to operate at all times during the welding process, but at a minimum speed selected in accordance with particular welding parameters. As a result, the fan consumes less power and is more responsive and efficient system compared to other controls.

In some examples, the fan speed determination is based in part on the welding parameters and in part on a temperature measurement. Additionally or alternatively, a thermal model can be developed based on the operating values. The fan speed controller can incorporate the thermal model to affect adequate cooling of the system by introducing air to the power supply. In some examples, the fan speeds corresponding to different temperature levels are determined empirically and stored in a memory device accessible by the controller. The controller can access the memory to determine a fan speed corresponding to a measured temperature. For instance, a selected welding parameter may correspond to a particular fan speed, but the environmental conditions may have resulted in an elevated operating temperature. In such a case, the controller may increase the fan speed for enhanced cooling effect.

Welding-type power, as used herein, refers to power suitable for welding, plasma cutting, induction heating, air carbon-arc cutting and/or gouging (CAC-A), cladding, and/or hot wire welding/preheating (including laser welding and laser cladding), including switched mode power supplies, converters, choppers, resonant power supplies, quasi-resonant power supplies, etc., as well as control circuitry and other ancillary circuitry associated therewith.

In an example illustrated in FIG. 1, a welding-type system 100 includes a welding-type power supply 102 to operate one or more welding-type tools, such as a welding-type torch 114, and a power return clamp 118, to perform a welding operation on a workpiece 120. The welding-type power supply includes a controller 104 operatively connected to a multiple speed fan 106. On or more user interfaces 110 can be used to provide information to the controller 104. The fan 106 can be within a frame 108 to protect the fan 106 during operation. The fan 106 can introduce environmental air into the welding-type power supply 102 through a grate or louver panel 128. Air 126 flowing within the welding-type power supply 102 (e.g., through a wind tunnel) serves to cool internal components 122, 124, in accordance with the examples provided herein.

While the illustrated example shows the internal components 122, 124 directly in the path of the airflow, in other examples the internal components are thermally coupled to heat sinks or other components within the airflow while avoiding exposure of the internal components 122, 124 to any dust, debris, moisture, or other contaminants that may be entrained within the airflow.

The fan 106 can operate over a range of possible speeds based on one or more welding parameters. For example, during a welding operation, a high power output may be required, causing the internal components 122, 124 to heat up. Based on the welding parameters associated with the particular welding operation, the controller 104 can control the fan to vary the operating speed in accordance with empirical evidence stored therein (see FIG. 2). Therefore, the fan 106 operates efficiently in response to changing welding parameters and conditions.

As shown in FIG. 1, the welding-type torch 114 is connected to the welding-type power supply 102 suitable for powering welding operations via a welding-type cable 112, and the power return clamp 118 is connected via a welding-type cable 116. The welding torch 114 may be a torch configured for stick welding, tungsten inert gas (TIG) welding, metal inert gas (MIG), gas metal arc welding (GMAW), or other torch types, based on the desired welding application. Additional welding-type tools are also contemplated, such as an induction heating device, a plasma cutting torch, etc. (not shown). In some examples, the system 100 may be coupled to other devices, such as a wire feeder, an induction heater, a plasma cutter, a power generator, or any combination thereof.

In determining the appropriate fan speed, additional or alternative factors can be considered. For example, the fan 106 can operate at a given speed upon receipt of an activation signal (e.g., a welding arc is triggered), or selection of a particular weld process. In some examples, the fan 106 can operate at a given speed in advance of a welding operation in order to pre-cool internal components, such as when a selected operation requires a high power output, and/or the environmental temperature is high.

The fan 106 draws air along a path adjacent electrical component of the power supply 102. The air 126 flows through the interior of the power supply 102 for substantially the entire length of the enclosure, entering the interior through louvers 128 on one or more panels of the power supply 102. The louvers 128 can be constructed into the front and rear panels to accommodate air flow through the power supply 102.

Figure 2:
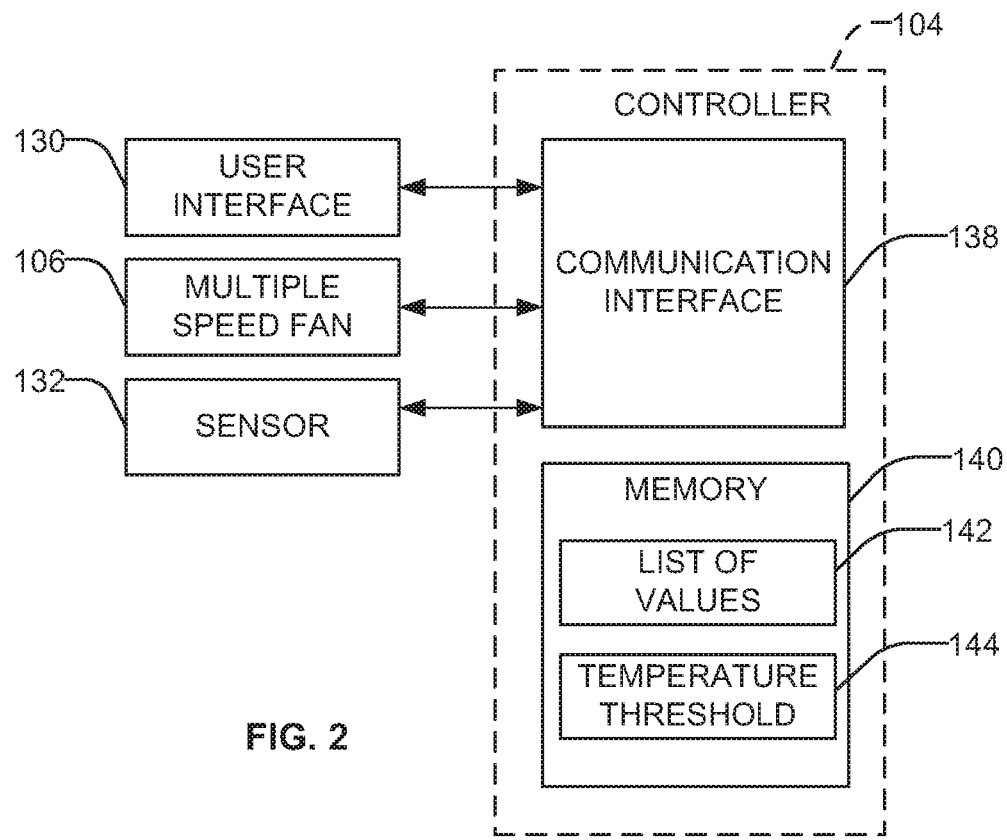
FIG. 2 is a block diagram of an example implementation of a controller of a welding system, in accordance with aspects of this disclosure.

FIG. 2 shows a block diagram of an example implementation of the controller 104 of FIG. 1. The controller 104 includes a communication interface 138 to transmit information to and receive information from one or more devices. The controller 104 further includes a memory 140 which contains a matrix or other listing of multiple values (e.g., list of values 142), as well as a matrix or other list of temperature thresholds 144. The interface 138 is operatively connected to a user interface 130 (e.g., interface 110), the multiple speed fan, and a sensor 132, such as a temperature sensor.

As described herein, the controller 104 controls the fan 106 to operate during operation of the welding-type power supply (e.g., power supply 102) at variable speeds in response to welding parameters. The example controller 104 of FIG. 2 controls the operations of the system 100 and may be a general-purpose computer, a laptop computer, a tablet computer, a mobile device, a server, and/or any other type of computing device integrated or remote to the system 100. In some examples, the controller 104 is implemented in a cloud computing environment, on one or more physical machines, and/or on one or more virtual machines.

The controller 104 may receive input from the one or more interfaces 140 through which the welding type system 100 receives commands from, for example, an operator (e.g., a welder). In some examples, the operator may employ the user interface 130 to choose a welding process (e.g., stick, TIG, MIG, etc.) and desired operating values of the power supply 102 (e.g., voltage, current, etc.). The interface 130 can be configured for inputting commands and/or customizing controls (e.g., graphical user interfaces (GUI), touch screens, communication pathways, etc.). The controller 104 may be configured to receive and process a plurality of inputs regarding the performance and demands of the system 100.

The memory device 140 may include volatile or non-volatile memory, such as ROM, RAM, magnetic storage memory, optical storage memory, or a combination thereof, and may be integrated with the controller 110, located remotely, or a combination of the two. In addition, a variety of control parameters may be stored in the memory device 140 along with code configured to provide a specific output during operation.

For example, the controller 104 is configured to access a memory 140 storing the list of values 142. In some examples, the controller 104 and the memory 140 are integrally located (e.g., within a computing device). In some examples, the controller 104 is connected to a network interface to access the list of values 142 via a communications network.

The controller 104 is configured to execute a process employing one or more welding parameters to determine a desired fan speed. The controller 104 compares the one or more welding parameters against a list of values stored in the memory device 140, which can then be used to adjust the fan speed to ensure proper operation of the system 100. For example, the controller 104 may utilize a look up table, an algorithm, and/or a model stored in the memory device 140 to determine the fan speed based on a relationship between the variables and the values stored in memory. The controller 104 can then adjust the fan speed in accordance with the corresponding welding parameter.

For known weld parameters, certain system operations can be estimated. For example, a particular weld parameter may correspond to a particular output and input, voltage and current levels, or a range of levels. Based on these estimated operational parameters, fan speed(s) required for adequate cooling are then determined empirically for the different temperature levels. In some examples, the controller 104 is configured to interpolate a fan speed based on two fan speed values associated with corresponding welding parameter values in the list of welding parameter values, the corresponding welding parameter values selected based on the value of the welding parameter. Additionally or alternatively, temperature measurements can also be considered in the determination of appropriate fan speed (e.g., based on a corresponding temperature threshold stored in the list of temperature thresholds 144 within memory 140).

By contrast to fans which respond solely to temperature and configured to turn on at maximum speed and off again based on high and low temperature thresholds, the described multiple speed fan is capable of cooling various welding components (e.g., components 122, 124 of FIG. 1) in response to demands of the system (e.g., corresponding to a welding parameter). Use of welding parameters also enables predictive cooling, such as increasing the fan speed prior to reaching a temperature threshold and/or reducing cooling more quickly after a weld operation has ended, if a threshold delay until a next welding operation can be predicted.

As a result, components within a welding-type power supply employing the multiple speed fan reach shutdown temperature limits faster by taking less time to cool to ambient temperatures when compared to fans that run continuously. For systems that employ switched mode power supply technologies, which include semiconductors and smaller sized transformers, cooling times are reduced as compared to transformer based machines with larger, magnetic components. Moreover, with a multiple speed fan, the internal components operate at a more constant temperature, making them less subject to large changes in temperature, thereby increasing the life of the components and the system.

In conventional on/off fan systems, once a high temperature threshold has been exceeded, the fan must shut down until the temperature lowers. Advantageously, for the system described herein, in a situation where the multiple speed fan is configured to maintain a speed that does not result in the fan overheating. Moreover, if a lower temperature limit is met, a conventional fan may shut down, whereas the multiple speed fan will continue to operate at a lower speed.

Fans speed can increase the amount of noise in a system as well as introduce environmental contaminants. In the proposed multiple speed fan control, the fan does not operate at full speed at all times but instead maintains a speed to adequately cool the system according to the welding parameter, temperature, etc. Operating over a range of speeds helps to reduce excess fan noise and keeps the system clean and in good operating condition by limiting the number of contaminating particles being pulled through the system at low speeds. The result is a decrease in maintenance requirements as well as improved reliability.

In an example, the controller (e.g., a control circuit) is configured to execute a set of instructions to operate the fan in discrete states, each state corresponding to one or more welding parameters and/or one or more temperature thresholds. In some examples, the controller 104 is configured to identify one or more states of operation corresponding to a fan speed or range of fan speeds, in accordance with the systems and methods described herein. Once identified, the controller 104 sends commands to the fan 106 to operate at a fan speed(s) that correspond(s) to the particular state.

In examples, an idle state corresponds to the welding-type power supply 102 being activated, yet no welding parameter has been identified, selected by a user, etc. An intermediate state is identified based on a determined welding parameter as well as a temperature measurement from the sensor 132, with the temperature measurement being below a first predetermined temperature threshold level. A maximum state is identified based on a determined welding parameter, where the temperature measurement exceeds the first predetermined temperature threshold level. An over-temperature state is determined based on the temperature measurement exceeding a second, greater predetermined temperature threshold level.

In examples, when the controller identifies a particular welding parameter(s) and/or temperature(s) corresponding to an idle state, the controller controls the fan to operate at a minimum fan speed. When the controller identifies a particular welding parameter(s) and/or temperature(s) corresponding to an intermediate state, the controller controls the fan to operate between a range of fan speeds, from a minimum and a maximum fan speed. When the controller identifies a particular welding parameter(s) and/or temperature(s) corresponding to an over-temperature state, the controller controls the fan to operate at a maximum fan speed.

Figure 3:
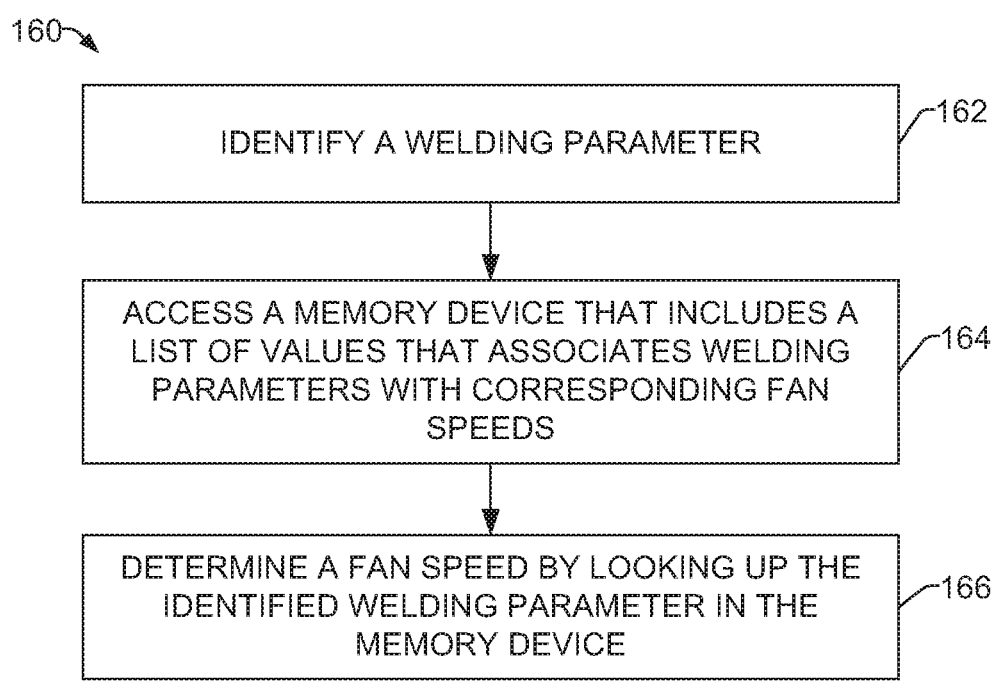
FIG. 3 is a flowchart illustrating example machine readable instructions which may be executed by a processor to implement the controller of FIGS. 1 and 2 to determine a fan speed based on a welding parameter of a welding-type system.

FIG. 3 is a flowchart illustrating example machine readable instructions 160 which may be executed by a processor (e.g., controller 110 of FIG. 1) to identify a welding parameter associated with a power supply (e.g., power supply 102) of a welding-type system (e.g., system 100). The example instructions 160 may be stored on the any suitable non-transitory machine readable media, such as memory device 140 described with respect to FIG. 2.

At block 162, a welding parameter is identified by the controller. At block 164, the controller accesses a memory device that includes a plurality of values (e.g., list of values 142). For example, the plurality of values can be contained in a matrix or a look up table that associates welding parameters with corresponding fan speeds. At block 166, the controller determines a fan speed by looking up the identified welding parameter in the memory device. Having determined the corresponding fan speed, the controller can control the fan to operate at the determined speed.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
a fan located within a housing of the welding-type power supply and configured to operate at multiple fan speeds, the fan to cool a plurality of components within the housing of the power supply; and
a controller comprising a control circuit configured to:
identify a welding process type and a temperature of the welding-type power supply;
determine an operating fan speed of the multiple fan speeds based on the welding process type and the temperature; and
control the fan to operate at a first fan speed in response to a determination of a first welding process type and to operate at a second fan speed in response to a determination of a second welding process type.

2. The welding-type power supply as defined in claim 1, wherein the controller is configured to output a fan speed control signal to the fan based on the operating fan speed.

3. The welding-type power supply as defined in claim 1, wherein the controller is configured to:
access a memory device that includes a plurality of values that associates welding process types with corresponding fan speeds; and
determine the operating fan speed by looking up the identified welding process type in the memory device.

4. The welding-type power supply as defined in claim 3, wherein the controller is configured to:
calculate a value associated with at least two welding process types; and
determine the operating fan speed by looking up the value in the plurality of values.

5. The welding-type power supply as defined in claim 3, wherein the controller is configured to:
receive a temperature measurement from a sensor in addition to identifying the welding process type;
compare the temperature measurement to a threshold temperature; and
determine whether the temperature measurement exceeds the threshold temperature.

6. The welding-type power supply as defined in claim 5, wherein the controller is further configured to output a fan speed control signal to operate the fan at a maximum speed when the temperature measurement exceeds the threshold temperature, thereby overriding the operating fan speed of the multiple fan speeds based on the welding process type.

7. The welding-type power supply as defined in claim 1, further comprising a switched mode power supply configured to power the fan, the controller configured to control the switched mode power supply to vary the operating fan speed of the fan based on the welding process type.

8. The welding-type power supply as defined in claim 7, wherein the controller is configured to vary pulse width modulation (PWM) of a fan speed control signal to control the fan speed based on the welding process type.

9. The welding-type power supply as defined in claim 1, wherein the first welding process type is an arc welding process, and the second welding process type is a cutting or gouging process.

10. The welding-type power supply as defined in claim 1, wherein the controller is configured to output a fan speed control signal to activate the fan in advance of a welding operation and pre-cool the welding-type power supply before outputting welding-type power during the welding operation based on a given welding process type selection.

11. The welding-type power supply as defined in claim 1, wherein the controller is configured to:
access a memory device that includes a list associating welding process types with an output of the welding-type power supply;
determine a thermal model of the welding-type power supply based on the output; and
output a fan control signal to control the fan based on the thermal model.

12. The welding-type power supply as defined in claim 11, wherein the controller is configured to output a fan control signal to control the fan in one of a discrete fan speed or a continuous fan speed.

13. The welding-type power supply as defined in claim 1, further comprising a housing having a wind tunnel, the fan being located at a first end of the wind tunnel to initiate movement of environmental air through the wind tunnel to cool a plurality of components within the housing of the power supply.

14. A non-transitory machine readable storage device comprising machine readable instructions which, when executed by a control circuit of a welding-type power supply, cause the control circuit to:
identify a welding process type of the welding-type power supply;
determine a fan speed of a multiple speed fan based on the welding process type; and
output a first fan speed control signal to the multiple speed fan to operate at a first fan speed in response to a determination of a first welding process type; and
output a second fan speed control signal to the multiple speed fan to operate at a second fan speed in response to a determination of a second welding process type.

15. The non-transitory machine readable storage device as defined in claim 14, wherein the instructions, when executed, cause the control circuit to:

access a memory device that includes a plurality of values that associates welding parameters with corresponding fan speeds; and determine the fan speed by looking up the welding process type in the memory device.

16. The non-transitory machine readable storage device as defined in claim 14, wherein the instructions, when executed, cause the control circuit to:

receive a temperature measurement from a sensor; and identify a state of operation for the multiple speed fan based on the welding process type and a temperature measurement, the state being selected from an idle state, an intermediate state, a maximum state, or an over-temperature state.

17. The non-transitory machine readable storage device as defined in claim 16, wherein the instructions, when executed, cause the control circuit to:

output a minimum fan speed control signal in the idle state;

output a control signal that ranges between a minimum and maximum fan speed in the intermediate state; and output a maximum fan speed in the maximum state and the over-temperature state.

18. The non-transitory machine readable storage device as defined in claim 16, wherein the instructions, when executed, cause the control circuit to:

identify the idle state based on the welding-type power supply being activated and no welding process type being identified;

identify the intermediate state based on the determined welding process type and the temperature measurement being below a first predetermined temperature level;

identify the maximum state based on the determined welding process type and the temperature measurement exceeding the first predetermined temperature level; and identify the over-temperature state based on the temperature measurement exceeding a second predetermined temperature level.

19. A method comprising:

identifying, by a controller, a welding process type of a welding-type power supply, wherein the welding process type comprises one of tungsten inert gas (TIG) welding, metal inert gas (MIG) welding, gas metal arc welding (GMAW), plasma cutting, or induction heating;

accessing, by the controller, a memory device that includes a plurality of values that associates welding process types with corresponding fan speeds of a multiple speed fan;

determining, by the controller, a fan speed by looking up the identified welding process type in the memory device;

output a first fan speed control signal to the multiple speed fan to operate at a first fan speed in response to a determination of a TIG, MIG, or GMAW welding process type; and output a second fan speed control signal to the multiple speed fan to operate at a second fan speed in response to a determination of a plasma cutting welding process type.

* * * * *